(12) United States Patent
Shekh-Yusef

(10) Patent No.: US 10,601,595 B2
(45) Date of Patent: Mar. 24, 2020

(54) SECURE APPLICATION ATTACHMENT

(71) Applicant: Avaya Inc., Santa Clara, CA (US)

(72) Inventor: Rifaat Shekh-Yusef, Belleville (CA)

(73) Assignee: Avaya Inc., Santa Clara, CA (US)

( * ) Notice: Subject to any disclaimer, the term of this patent is extended or adjusted under 35 U.S.C. 154(b) by 70 days.

(21) Appl. No.: 15/146,721

(22) Filed: May 4, 2016

(65) Prior Publication Data

US 2017/0324561 A1 Nov. 9, 2017

(51) Int. Cl.

| H04L 9/32 | (2006.01) |
|---|---|
| H04L 29/06 | (2006.01) |
| H04W 12/06 | (2009.01) |
| H04L 9/00 | (2006.01) |
| H04L 9/14 | (2006.01) |
| H04L 9/30 | (2006.01) |
| H04L 29/08 | (2006.01) |

(52) U.S. Cl.
CPC ............ *H04L 9/3247* (2013.01); *H04L 9/006* (2013.01); *H04L 9/14* (2013.01); *H04L 9/30* (2013.01); *H04L 63/0428* (2013.01); *H04L 63/06* (2013.01); *H04L 63/0807* (2013.01); *H04L 63/0823* (2013.01); *H04L 63/0884* (2013.01); *H04L 63/166* (2013.01); *H04L 67/02* (2013.01); *H04L 67/141* (2013.01); *H04L 67/42* (2013.01); *H04W 12/06* (2013.01)

(58) Field of Classification Search
CPC .................................................. H04L 9/3247
USPC ........................................................ 713/176
See application file for complete search history.

(56) References Cited

U.S. PATENT DOCUMENTS

| 7,243,370 B2 * | 7/2007 | Bobde ............... H04L 29/06027 726/10 |
| 8,225,093 B2 | 7/2012 | Fok et al. |
| 8,370,431 B1 * | 2/2013 | Wang ................ H04L 29/06421 709/203 |
| 8,601,557 B2 * | 12/2013 | Slaton ................... H04L 63/083 707/607 |
| 8,904,195 B1 | 12/2014 | Rahat et al. |
| 9,224,001 B2 * | 12/2015 | Ayyalasomayajula ....................... H04W 8/245 |
| 2002/0138572 A1 * | 9/2002 | Delany ................... G06F 21/41 709/204 |
| 2003/0093680 A1 * | 5/2003 | Astley ................... G06F 21/445 713/183 |
| 2004/0059711 A1 * | 3/2004 | Jandel ..................... H04L 67/38 |

(Continued)

*Primary Examiner* — Peter C Shaw
(74) *Attorney, Agent, or Firm* — Sheridan Ross P.C.

(57) ABSTRACT

To secure an application, a request to establish a communication session with a client is received from the application, at a server. The server sends the request to establish the communication session to the client. The request to establish the communication session generates a request for a user to approve the application. If the request is approved, a client token is received. A certificate with a public key and a private key is created and the public key is sent to the application. An application token that is encrypted using the public key is received from the application. The application token is unencrypted using the private key and compared to the client token. In response to the unencrypted application token matching the client token, an approval message is sent to the client to establish the communication session. The application can then establish a secure communication session with the client.

20 Claims, 4 Drawing Sheets

(56) References Cited

U.S. PATENT DOCUMENTS

| | | | |
|---|---|---|---|
| 2005/0086471 A1* | 4/2005 | Spencer | H04L 9/0894 713/165 |
| 2005/0120214 A1* | 6/2005 | Yeates | H04L 63/08 713/171 |
| 2007/0218924 A1* | 9/2007 | Burman | H04L 29/06027 455/466 |
| 2008/0028447 A1* | 1/2008 | O'Malley | G06F 21/31 726/6 |
| 2009/0043849 A1* | 2/2009 | Blackburn | H04L 51/04 709/205 |
| 2009/0132828 A1* | 5/2009 | Kiester | H04L 9/3247 713/185 |
| 2009/0313476 A1* | 12/2009 | Liu | H04L 63/10 713/182 |
| 2013/0080513 A1* | 3/2013 | Debate | H04L 12/1854 709/203 |
| 2013/0097427 A1* | 4/2013 | Billings | H04L 9/3228 713/182 |
| 2013/0227291 A1* | 8/2013 | Ahmed | H04L 63/0281 713/171 |
| 2014/0208404 A1* | 7/2014 | Brouwer | G06F 21/62 726/6 |
| 2016/0119315 A1* | 4/2016 | Uzelac | H04L 63/0807 726/9 |
| 2016/0189510 A1* | 6/2016 | Hutz | G08B 21/0205 340/541 |
| 2016/0352526 A1* | 12/2016 | Adler | H04L 67/1095 |
| 2017/0374046 A1* | 12/2017 | Narasimhan | H04L 63/06 |

* cited by examiner

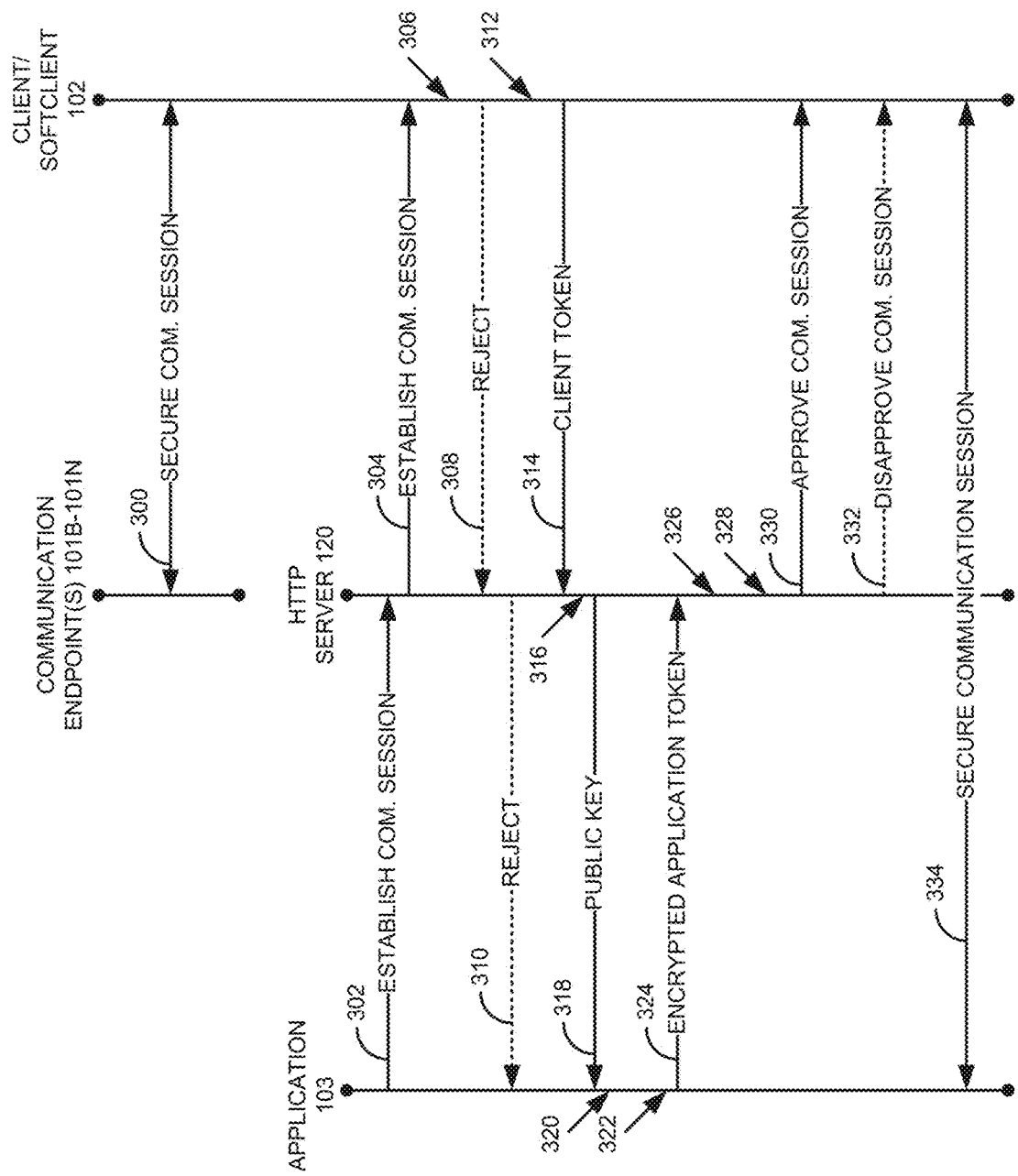

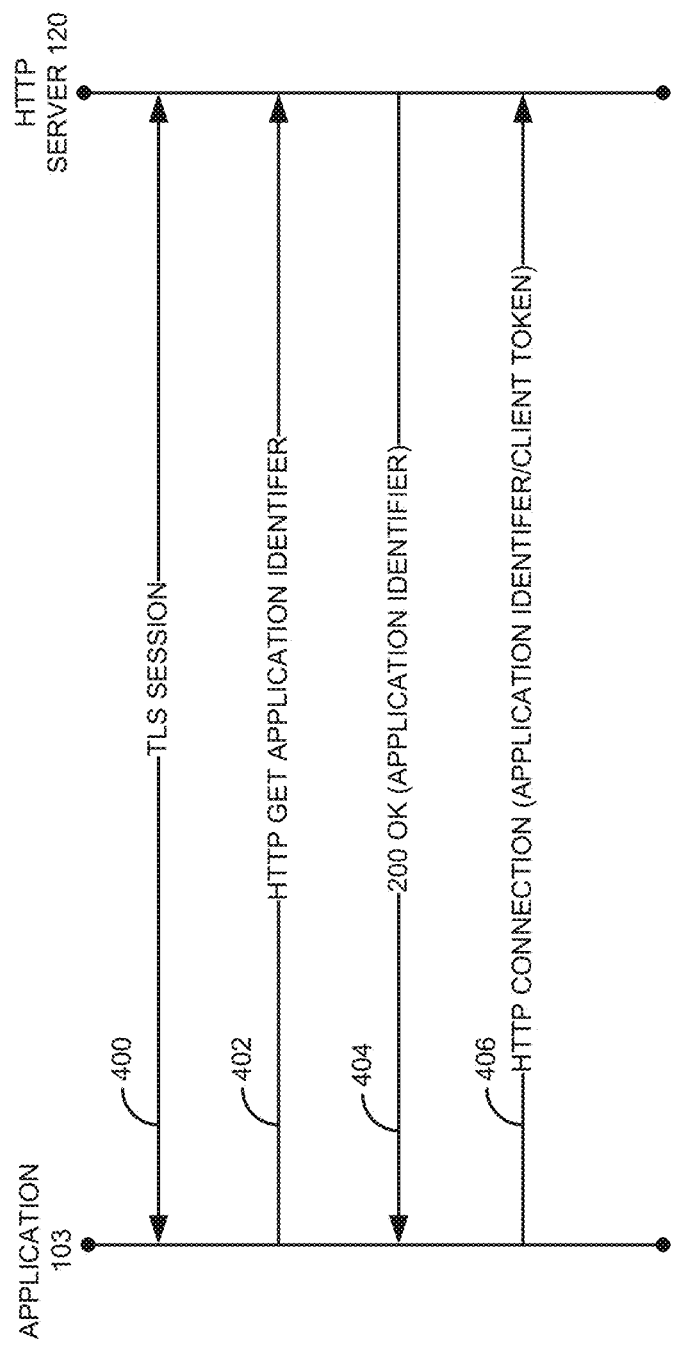

SECURE APPLICATION ATTACHMENT

FIELD

The disclosure relates generally to communication systems and particularly to secure use of applications in communication systems.

BACKGROUND

Currently, when a softclient is used in a communication endpoint to establish a communication session with another communication endpoint, if the communication session is has been encrypted, a link between the softclient and the other communication endpoint will be secure. However, if other applications on the communication endpoint, become part of the communication session, the overall communication session may now become unsecure. For example, if a user connects a wireless headset/a wireless headset application, the link between the softclient and the wireless headset application may be unsecure, resulting in the communication session becoming unsecure.

SUMMARY

These and other needs are addressed by the various embodiments and configurations of the present disclosure. To secure an application, a request to establish a communication session with a client (e.g., a softclient) is received from the application, at a server. The server sends the request to establish the communication session to the client. The request to establish the communication session generates a request for a user to approve the application. If the request is approved, a client token is received. A certificate with a public key and a private key is created and the public key is sent to the application. An application token that is encrypted using the public key is received from the application. The application token is unencrypted using the private key and compared to the client token. In response to the unencrypted application token matching the client token, an approval message is sent to the client to establish the communication session. The application can then establish a secure communication session with the client.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

BRIEF DESCRIPTION OF THE DRAWINGS

FIG. 3 is a flow diagram of a process for securely attaching an application to a client communication session.

FIG. 4 is a flow diagram of a process for retrieving an application identifier to further secure a client communication session.

DETAILED DESCRIPTION

Figure 1:
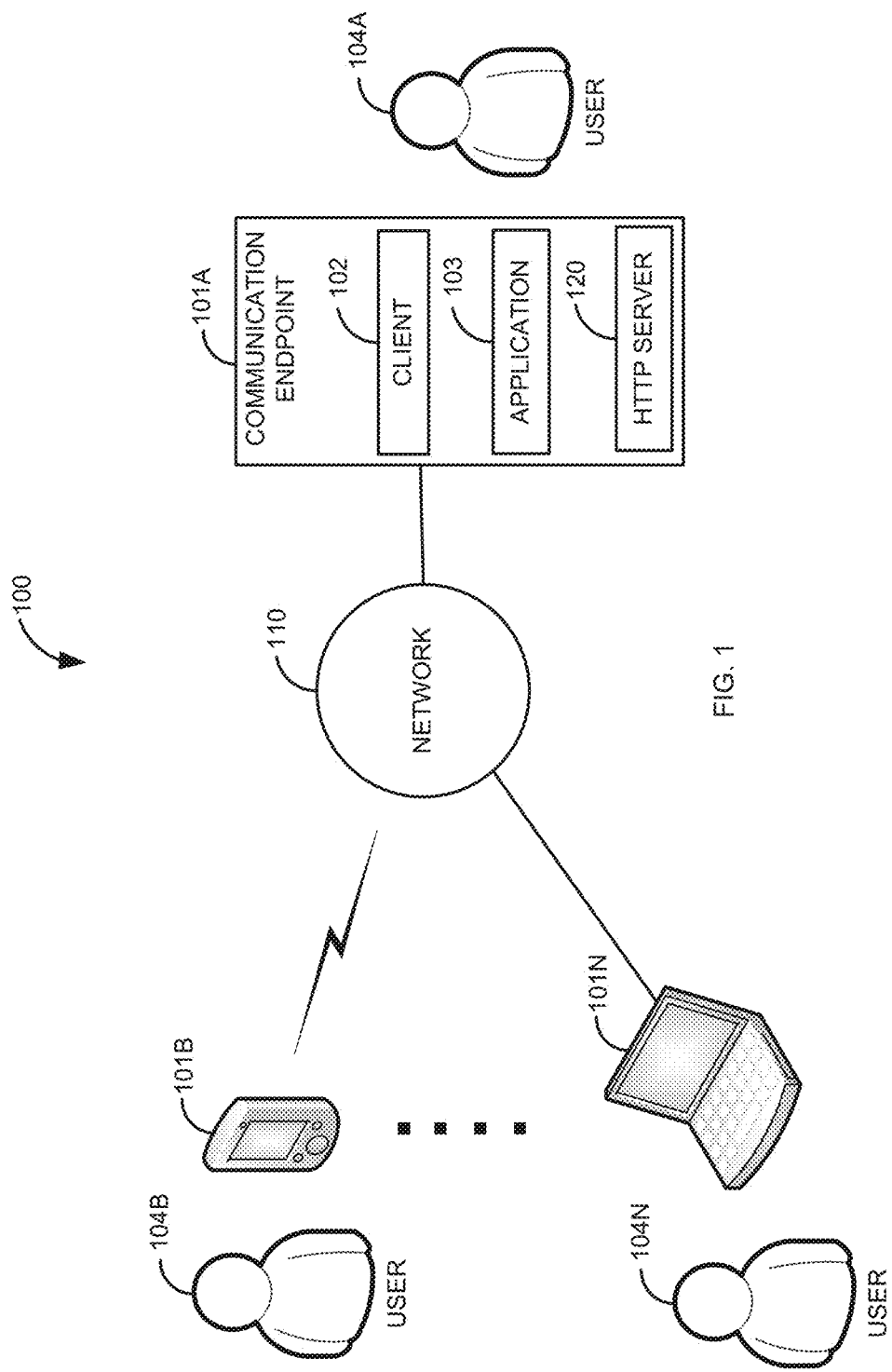
FIG. 1 is a block diagram of a first illustrative system for securely attaching an application to a client communication session.

FIG. 1 is a block diagram of a first illustrative system 100 for securely attaching an application 103 to a client communication session. The first illustrative system 100 comprises communication endpoints 101A-101N and a network 110.

The communication endpoints 101A-101N can be or may include any communication endpoint device that can communicate on the network 110, such as a Personal Computer (PC), a telephone, a video system, a cellular telephone, a Personal Digital Assistant (PDA), a tablet device, a notebook device, a web server, a media server, a smart phone, and the like. The communication endpoints 101A-101N are devices where a communication sessions ends. The communication endpoints 101A-101N are not network elements that facilitate and/or relay a communication session in the network 110, such as a communication manager or router. As shown in FIG. 1, any number of communication devices 101A-101N may be connected to the network 110.

The communication endpoint 101A further comprises a client 102, an application 103, and a Hyper Text Transfer Protocol (HTTP) server 120. A client 102 is a communication application with associated hardware, such as, a telephone, a video phone, an Instant Messaging (IM) system, an email system. The client 102 may be a softclient 102. A softclient is a software only communication application, such as, a softphone, a video phone application, an email client, an IM client, and/or the like that may be installed on the communication endpoint 101A. The communication endpoint 101A may comprise a client 102 and/or a softclient 102. In FIG. 1, the communication endpoints 101B-101N may also comprise the client 102, the application 103 and/or the HTTP server 120.

The application 103 may be any application 103 used in conjunction with the client 102, such as a wireless headset application, a credit card application, a contact center application, a wireless video headset application, a document attachment application, a security application, a video/audio mixing application, a communication application, and/or the like. The application 103 is used in conjunction with the client 102 to provide an overall security solution for communication sessions. The application 103 may comprise a plurality of applications 103 on the communication endpoint 101A. For example, the application 103 may comprise a wireless headset application and a credit card application.

The HTTP server 120 is an application that has an HTTP server 120. In FIG. 1, the HTTP server 120 is part of the communication endpoint 101A. The HTTP server 120 is a mechanism for securing communications between the client 102 and the application 103. In the descriptions described herein, a HTTP server 120 is used in the exemplary embodiments. However, the descriptions provided herein may use a different type of server, such as a Session Initiation Protocol (SIP) server, a Web Real-Time Communication protocol (WebRTC) server, and/or the like.

The network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of electronic protocols, such as Ethernet, Internet Protocol (IP), Session Initiation Protocol (SIP), Integrated Services Digital Network (ISDN), HTTP, WebRTC, and the like. Thus, the network 110 is an electronic communication network configured to carry messages via packets and/or circuit switched communications.

Figure 2:
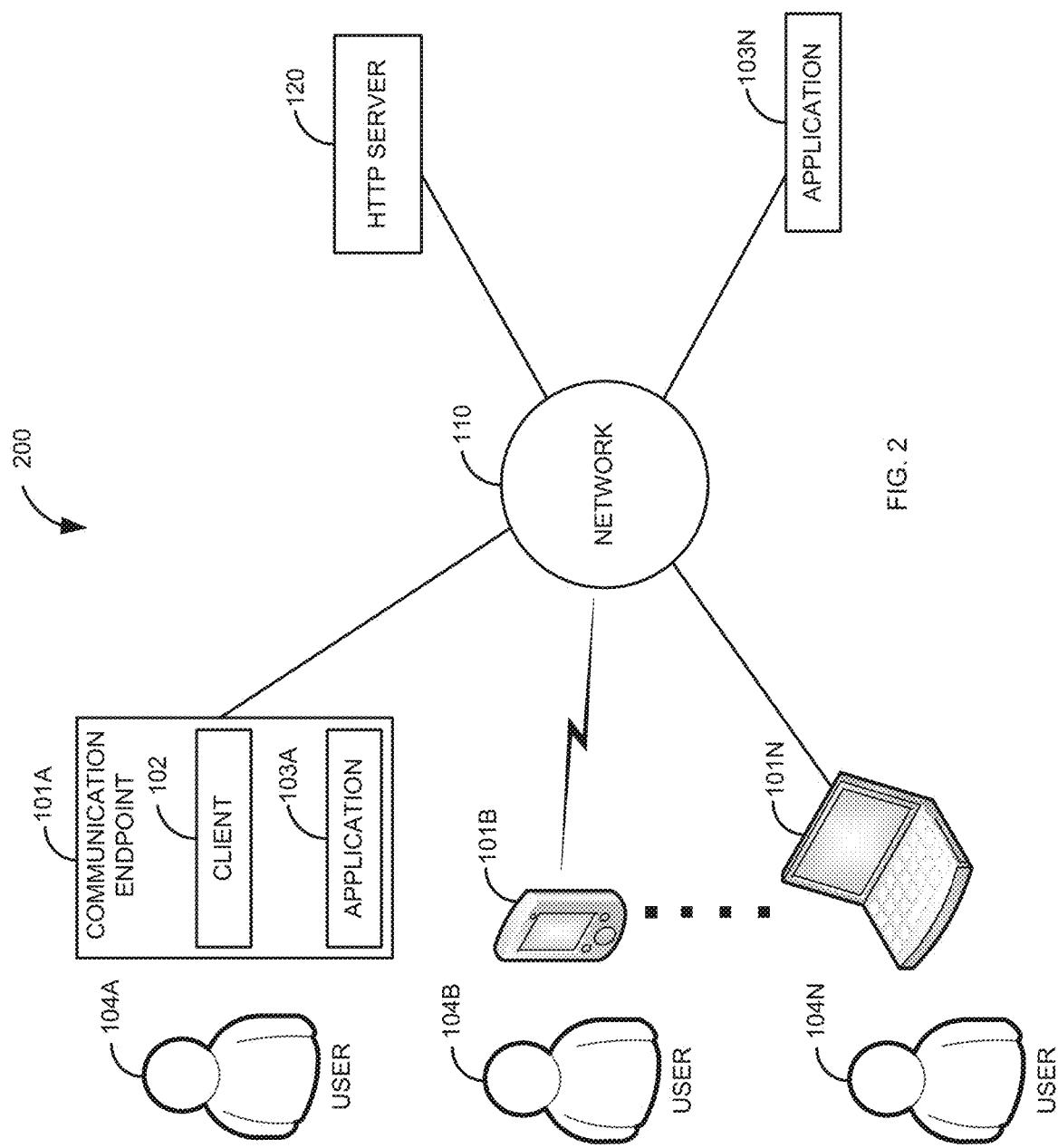
FIG. 2 is a block diagram of a second illustrative system for securely attaching an application to a client communication session.

FIG. 2 is a block diagram of a second illustrative system 200 for securely attaching an application 103 to a client communication session. The second illustrative system 200 comprises the communication endpoints 101A-101N, the network 110, the HTTP server 120, and applications 103A-103N. Applications 103A-103N may comprise two or more applications 103. In FIG. 2, the HTTP server 120 is external to the communication endpoint 101A. Likewise, the application 103N is external to the communication endpoint 101A.

FIG. 2 represents an embodiment where applications 103 may be either on the communication endpoint 101A and/or external to the communication endpoint 101A. For example, the application 103A may be a wireless headset application and the application 103N may be an external credit card application (e.g., running on a web server). The user 104A may use the application 103A in one communication session and the application 103N in a different communication session. Alternatively, the user 104A may use the applications 103A-103N in the same communication session. If multiple applications 103 are used in the same communication session, the processes described below will be completed for each application 103.

FIG. 3 is a flow diagram of a process for securely attaching an application 103 to a client communication session. Illustratively, the communication endpoints 101A-101N, the client 102, the applications 103A-103N, and the HTTP server 120 are stored-program-controlled entities, such as a computer or microprocessor, which performs the method of FIGS. 3-4 and the processes described herein by executing program instructions stored in a computer readable storage medium, such as a memory or disk. Although the methods described in FIGS. 3-4 are shown in a specific order, one of skill in the art would recognize that the steps in FIGS. 3-4 may be implemented in different orders and/or be implemented in a multi-threaded environment. Moreover, various steps may be omitted or added based on implementation.

The process starts in step 300 where a secure communication session is established between the client 102 and one or more of the communication endpoints 101A-101N. For example, the secure communication session of step 300 may be an encrypted voice conference call or a secure IM session between the communication endpoints 101A-101N.

In this exemplary embodiment, the process of step 300 is shown before steps 302-326. However, in other embodiments, the process of step 300 may occur after or during steps 302-326. The secure communication session of step 300 may use a variety of communication protocols, such as HTTP, SIP, H.323, Transport Layer Security (TLS), Secure Sockets Layer (SSL), Real-Time Protocol (RTP), secure RTP (SRTP), video protocols, IM protocols, email protocols, text messaging protocols, and/or the like. The secure communication session of step 300 may use the same and/or different protocols than steps 302-326. For example, the secure communication session of step 300 may use SIP/SRTP and the process of steps 302-326 may use HTTP/TLS.

The application 103 sends a request to establish a communication session with the client 102 in step 302. The request to establish the communication session with the client 102 of step 302 may be initiated based on various criteria. For example, the request to establish the communication session may be sent based on the user 104A clicking on an icon for the application 103 via a Graphical User Interface (GUI) on the communication endpoint 101A, based on a user defined configuration, automatically when the secure communication session 300 is established, based on a previous use of the application 103 in a previous secure communication session, based on the client 102 sending a message to the application 103, and/or the like. The request to establish the communication session of step 302 may use a variety of protocols, such as HTTP (e.g., a HTTP connect), SIP (e.g., a SIP INVITE), WebRTC message, and/or the like.

The HTTP server 120 sends the request to establish the communication session to the client 102 in step 304. In response to receiving the request to establish the communication session in step 304, the client 102 generates a request to ask the user 104A to approve use of the application 103 in step 306. For example, the client 102 may display to the user 104A a pop-up window asking the user 104A to approve the use of the application 103 in the communication session in step 306.

If the user 104A rejects the use of the application 103, in step 306, the client 102 sends a reject message, in step 308, to the HTTP server 120. The HTTP server 120 sends the reject message 310 to the application 103 in step 310 and the process ends.

Otherwise, if the user 104A approves the use of the application 103 in step 306, the client 102 generates a client token in step 312. The client token may be generated, in step 312, based on various types of information, such as a user password, a random number, a digital certificate of the user 104A, and/or the like. For example, the client token may be generated based on a hash of a user password and a random number. The hashing algorithm that is used to produce the client token may use one or more hashing algorithms, such as, BLAKE-256, BLAKE-512, MD2, MD4, MD5, MD6, SHA-1, SHA-224, SHA-256, SHA-384, SHA-512, HAVAL, and/or the like. The generated client token of step 312 is displayed to the user 104A in step 312. The user 104A then saves the client token for use later on in step 320.

The client 102 sends the client token to the HTTP server 120 in step 314. The HTTP server 120, in step 316, creates a certificate (e.g., a self-signed certificate) using a public key and a private key. For example, the HTTP server 120 creates a digital certificate using public key, Private Key Infrastructure (PKI), or any known private key/public system. The digital certificate, in this embodiment, is a self-signed certificate (not created by a certificate authority). The HTTP server 120 sends the public key to the application 103 in step 318.

In response to receiving the public key in step 318, the application 103 prompts the user 104A to enter an application token in step 320. The application token is the client token (saved in step 312) entered by the user 104A in the application 103. For example, the user 104A copies the client token saved in step 312 into a pop-up window that instructs the user 104A to copy the client token of step 312 and click an Okay button. In response, the application 103 encrypts the application token using the public key in step 322. The application 103 sends the encrypted application token to the HTTP server 120 in step 324.

The HTTP server 120 unencrypts the application token using the private key in step 326. The HTTP server 120 compares, in step 328, the unencrypted application token to the client token received in step 314. If the application token matches the client token in step 328 (i.e., the user 104A copied the client token of step 312 in step 320), the HTTP server 120 sends an approval message to establish the communication session to the client 102 in step 330. Since the communication session has been approved, the client/soft client 102 establishes a secure communication session with the application 103 in step 334.

Otherwise, if the application token does not match the client token (i.e., the user 104A entered something else or it is a hacking attempt) in step 328, the HTTP server 120 sends a message to disapprove the communication session in step 332. If the communication session is disapproved in step 332, the secure communication session of step 334 does not occur.

To illustrate, consider the following example. Assume a configuration as described in FIG. 1 where the softclient 102, the application 103, and the HTTP server 120 are all on the communication endpoint 101A.

The user 104A has established a secure voice communication session with the users 104B-104N (step 300) using the softclient 102 on the communication endpoint 101A. The user 104A decides that he wants to use a wireless headset application 103 during the secure voice communication session. The user 104A brings up the wireless headset application 103. As a result, the wireless headset application 103 sends a request to establish a communication session with the softclient 102 (step 302). The HTTP server 120 sends the request to establish the communication session to the softclient 102 (step 304). The softclient 102 asks the user 104A to approve use of the wireless headset application 103 (step 306). The user 104A approves use of the wireless headset application 103 (step 306). The softclient 102 creates a client token using a user password and random number with a SHA 256 hashing algorithm (step 312). The client token is presented to the user 104A and saved by the user 104A (step 312). The softclient 102 sends the client token to the HTTP server 120 (step 314).

The HTTP server 120 creates a self-signed certificate using a private and a public key (step 316). The HTTP server 120 sends the public key to the application 103 (step 318). The application 103 requests the user 104A to enter the application token (the client token saved in step 312) in step 320. The user 104A copies the client token and saves the client token as the application token (step 320). The application 103 encrypts the application token using the public key (step 322). The application 103 sends the encrypted application token to the HTTP server 120 (step 324). The HTTP server 120 unencrypts the application token using the private key (step 326). The HTTP server 120 compares the unencrypted application token to the client token of step 314 (step 328). In this case, the client token matches the application token. The HTTP server 120 sends the message to approve the communication session in step 330. The secure communication session is then established between the wireless headset application 103 and the softclient 102 (step 334). This allows the user 104A to talk on the wireless headset (via the secure communication channel of step 334) to the other users 104B-104N on the secure voice communication session of step 300.

In a second exemplary embodiment, the application 103 is a browser application 103N that is on the network 110 as shown in FIG. 2. In this example, the user 104A can copy the client token of step 312 to the browser application 103 in step 320. The process would provide the same security for the browser application 103.

FIG. 4 is a flow diagram of a process for retrieving an application identifier to further secure a client communication session. The process of FIG. 4 is implemented using HTTP/TLS. However, other protocols may be used to share an application identifier. For example, SIP and Secure Sockets Layer (SSL) may be used.

A TLS connection (communication session) is established between the HTTP server 120 and the application 103 in step 400. The TLS connection can be established by using the client token to establish a pre-shared-key TLS session, by using a persistent self-signed certificate created by the HTTP server 120 to establish the TLS connection, and the like in step 400.

Once the TLS connection is established in step 400, the application 103 sends a HTTP GET to get an application identifier from the HTTP server 120 in step 402. The application identifier is used in conjunction with the client token to uniquely identify the application 103. This way, if the client token is somehow compromised, the application identifier can be used to further distinguish between a valid client token from the application 103 and a compromised token that does not have the application identifier.

The HTTP server 120 sends, in step 404, a 200 OK message with the application identifier to the application 103. The next time the application 103 attempts to establish a communication session (e.g., an HTTP connection in this example), the communication session is established using the application identifier and the client token in step 406.

To illustrate, consider the following examples. Assume that the user 104A has previously used the wireless headset application 103 as described above. If after the initial use of the headset is completed, the wireless headset will have received a session identifier. The wireless headset application 103 can automatically establish the TLS session using the client token and the application identifier without having the user approve/copy the client token/application token. Once the HTTP server 120 has authenticated the client token/application the HTTP connection of step 406 is automatically completed.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

The exemplary systems and methods of this disclosure have been described in relation to a communication network. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device (s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s)

or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system comprising:
a microprocessor; and
a computer readable medium, coupled with the microprocessor and comprising microprocessor readable and executable instructions that program the microprocessor to execute a server that:
receives, from an application, a request for the application to be added to an existing communication session, wherein the existing communication session is between a client and at least one other user communication endpoint, wherein the client is in a first user communication endpoint, and wherein the application is in at least one of: the first user communication endpoint and a network device that is external to the first user communication endpoint;
sends the request for the application to be added to the existing communication session, to the client, wherein the request for the application to be added to the existing communication session is associated with a request by the client for a user to approve the application to be added to the existing communication session;
receives, from the client, a client token;
creates a certificate with a public key and a private key;
sends, to the application, the public key;
receives, from the application, an application token that is encrypted using the public key;
unencrypts the application token using the private key;
compares the unencrypted application token to the client token; and sends an approval message to the client requesting a user of the first user communication endpoint to add the application to the existing communication session in response to the unencrypted application token matching the client token; and wherein the client token is based on a client password.

2. The system of claim 1, wherein the application token is copied from the client token based on user input.

3. The system of claim 1, wherein the client token is based on the password and a random number.

4. The system of claim 1, wherein the existing communication session is encrypted, and wherein adding the application to the existing communication session comprises adding an additional communication link to the existing encrypted communication session between.

5. The system of claim 1, wherein the server establishes an encrypted communication session with the application using the application token; receives a request for an application identifier; and sends the request for the application identifier to the application, wherein the application uses the application identifier and the client token for any subsequent communications.

6. The system of claim 1, wherein the server establishes an encrypted communication session with the application using a self-signed certificate by the server; receives a request for an application identifier; and sends the request for the application identifier to the application, wherein the application uses the application identifier and the client token for any subsequent communication sessions.

7. The system of claim 1, wherein the server and the application are in the first user communication endpoint.

8. The system of claim 1, wherein the server sends a denial message to the client to not add the application to the existing communication session in response to the unencrypted application token not matching the client token.

9. The system of claim 1, wherein the encrypted application token is an encrypted version of the client token.

10. The system of claim 1, wherein the request to add the application to the existing communication session is sent based one of the following:
the user clicking on an icon for the application;
a user defined configuration;
a previous use of the application in a previous secure communication session; or
the client sending a message to the application.

11. A method comprising:
receiving, from an application, by a microprocessor, a request for the application to be added to an existing communication session, wherein the existing communication session is between a client and at least one other user communication endpoint, wherein the client is in a first user communication endpoint, and wherein the application is in at least one of: the first user communication endpoint and a network device that is external to the first user communication endpoint;
sending, by the microprocessor, the request for the application to be added to the existing communication session to the client, wherein the request for the application to be added to the existing communication that is sent to the client is associated with a request by the client for a user to approve the application to be added to the existing communication session;
receiving, from the client and by the microprocessor, a client token;
creating, by the microprocessor, a certificate with a public key and a private key;
sending, to the application and by the microprocessor, the public key;
receiving, from the application and by the microprocessor, an application token that is encrypted using the public key;
unencrypting, by the microprocessor, the application token using the private key;
comparing, by the microprocessor, the unencrypted application token to the client token; and
in response to the unencrypted application token matching the client token, sending, by the microprocessor, an approval message to the client requesting a user of the first user communication endpoint to add the application to the existing communication session; and
wherein the client token is based on a client password.

12. The method of claim 11, wherein the application token is copied from the client token based on user input.

13. The method of claim 11, wherein the client token is based on the password and a random number.

14. The method of claim 11, wherein the existing communication session is encrypted, and wherein adding the application to the existing communication session comprises adding an additional communication link to the existing encrypted communication session.

15. The method of claim 11, further comprising:
establishing, by the microprocessor, an encrypted communication session with the application using the application token;
receiving, by the microprocessor, a request for an application identifier; and
sending, by the microprocessor, the request for the application identifier to the application, wherein the application uses the application identifier and the client token for any subsequent communications.

16. The method of claim 11, further comprising:
establishing, by the microprocessor, an encrypted communication session with the application using a self-signed certificate;
receiving, by the microprocessor, a request for an application identifier; and
sending, by the microprocessor, the request for the application identifier to the application, wherein the application uses the application identifier and the client token for any subsequent communication sessions.

17. The method of claim 11, wherein the microprocessor and the application are in the first user communication endpoint.

18. The method of claim 11, further comprising: in response to the unencrypted application token not matching the client token, sending, by the microprocessor, a denial message to the client to not add the application to the existing communication session.

19. The method of claim 11, wherein the encrypted application token is an encrypted version of the client token.

20. The method of claim 11, wherein the request to add the application to the existing communication session is sent based one of the following:
the user clicking on an icon for the application;
a user defined configuration;
a previous use of the application in a previous secure communication session; or
the client sending a message to the application.

* * * * *